(12) United States Patent
Anders et al.

(10) Patent No.: US 9,506,439 B2
(45) Date of Patent: Nov. 29, 2016

(54) DUCTED COMBUSTION SYSTEMS UTILIZING ADJUSTABLE LENGTH DUCTS

(71) Applicant: Caterpillar Inc., Peoria, IL (US)

(72) Inventors: Jonathan Anders, Peoria, IL (US); Kenth Svensson, Peoria, IL (US); Chad Koci, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 46 days.

(21) Appl. No.: 14/685,083

(22) Filed: Apr. 13, 2015

(65) Prior Publication Data

US 2016/0298531 A1   Oct. 13, 2016

(51) Int. Cl.
| | |
|---|---|
| *F02M 61/18* | (2006.01) |
| *F02B 23/00* | (2006.01) |
| *F02D 41/30* | (2006.01) |

(52) U.S. Cl.
CPC .......... *F02M 61/1813* (2013.01); *F02B 23/00* (2013.01); *F02D 41/3005* (2013.01); *F02M 61/182* (2013.01); *F02M 61/1806* (2013.01)

(58) Field of Classification Search
CPC ............... F02M 61/1813; F02M 61/1806; F02M 61/182
USPC ....................... 123/298, 305, 193.5
See application file for complete search history.

(56) References Cited

U.S. PATENT DOCUMENTS

| | | |
|---|---|---|
| 3,057,334 A | 10/1962 | Bailey |
| 3,209,735 A | 10/1965 | Stanley |
| 3,950,056 A | 4/1976 | Bowen |
| 3,963,001 A | 6/1976 | Kruckenberg et al. |
| 3,980,056 A | 9/1976 | Kraus |
| 5,224,458 A | 7/1993 | Okada et al. |
| 6,095,437 A | 8/2000 | Nozawa |
| 6,725,824 B2 | 4/2004 | Donauer et al. |
| 7,213,564 B2 | 5/2007 | Hill et al. |
| 7,237,527 B2 * | 7/2007 | Pontoppidan ...... F02M 61/1826 123/298 |
| 7,987,830 B2 * | 8/2011 | Kim .................. F01L 1/02 123/193.5 |
| 2010/0275878 A1 | 11/2010 | Phillips |
| 2012/0186555 A1 | 7/2012 | Mueller |
| 2016/0097360 A1 | 4/2016 | Mueller |

FOREIGN PATENT DOCUMENTS

| | | | | |
|---|---|---|---|---|
| DE | 102005056764 A1 | * | 5/2007 | .......... F02B 23/0669 |
| DE | 102014117439 A1 | * | 6/2015 | .......... F02M 61/1806 |
| FR | 2895019 A1 | | 6/2007 | |
| JP | 59120715 A | | 7/1984 | |
| JP | 05106441 A | | 4/1993 | |
| JP | 0826770 B2 | | 3/1996 | |
| JP | 3695011 B2 | | 9/2005 | |
| WO | 9110825 A1 | | 7/1991 | |

* cited by examiner

*Primary Examiner* — Mahmoud Gimie
(74) *Attorney, Agent, or Firm* — Miller, Matthias & Hull LLP (57) ABSTRACT

A ducted combustion system is disclosed. The ducted combustion system includes a combustion chamber bound by a flame deck surface of a cylinder head of an internal combustion engine and by a piston top surface of a piston disposed within the internal combustion engine. The system includes a fuel injector including one or more orifices, the one or more orifices injecting fuel into the combustion chamber as one or more fuel jets. The system includes one or more adjustable length ducts disposed within the combustion chamber between the flame deck surface and the piston top surface, the one or more adjustable length ducts being disposed such that each of the one or more fuel jets, at least partially, enters one of the one or more adjustable length ducts upon being injected into the combustion chamber.

20 Claims, 10 Drawing Sheets

DUCTED COMBUSTION SYSTEMS UTILIZING ADJUSTABLE LENGTH DUCTS

TECHNICAL FIELD

The present disclosure generally relates to internal combustion engines and, more particularly, relates to ducted combustion systems for internal combustion engines.

BACKGROUND

Modern combustion engines may include one or more cylinders as part of the engine. The cylinder and an associated piston may define a combustion chamber therebetween. Within the combustion chamber, fuel for combustion is directly injected into the combustion chamber by, for example, a fuel injector, which is associated with the cylinder and has an orifice disposed such that it can directly inject fuel into the combustion chamber.

Different mixtures and/or equivalence ratios of the fuel/air mixture within the fuel jet may produce different results during combustion. The manners in which the injected fuel mixes and/or interacts with the air and other environmental elements of the combustion chamber may impact combustion processes and associated emissions. Further, if the fuel and air mixing is inadequate, then suboptimal or abnormally large amounts of soot may form within the combustion chamber.

To aid in preventing or reducing soot formation and to increase efficiency in such combustion engines, systems and methods for ducted combustion have been developed. For example, U.S. Patent Publication No. 2012/0186555 ("Ducted Combustion Chamber for Direct Injection Engines and Method") discloses ducted combustion within a combustion engine. The ducts of the '555 application generally include fins disposed around a fuel jet injected by a fuel injector. Such ducts may form a passageway corresponding to an orifice of the fuel injector, into which fuel jets are injected. The fuel jets may be channeled into the ducts, which may improve fuel combustion because upstream regions of a direct injected fuel jet may be affected by faster and more uniform mixing as well as by an inhibition or reduction of entrainment of combustion products from downstream regions of the same or neighboring jets.

While the teachings of the '555 application are advantageous in providing an improved fuel/air mixture, further improvements in fuel/air mixtures are always desired, as such improvements may further reduce emissions and soot formation. Therefore, systems and methods for ducted combustion that utilize adjustable length ducts for improving fuel/air mixtures are desired.

SUMMARY

In accordance with one aspect of the disclosure, a ducted combustion system is disclosed. The ducted combustion system may include a combustion chamber, which is defined as an enclosure bound at a first end by a flame deck surface of a cylinder head of an internal combustion engine and bound at a second end by a piston top surface of a piston disposed within the internal combustion engine. The system may further include a fuel injector in fluid connection with the combustion chamber and including one or more orifices opening from an injector tip of the fuel injector, the one or more orifices injecting fuel into the combustion chamber as one or more fuel jets. The system may further include one or more adjustable length ducts disposed within the combustion chamber between the flame deck surface and the piston top surface, the one or more adjustable length ducts being disposed such that each of the one or more fuel jets at least partially enters one of the one or more ducts upon being injected into the combustion chamber.

In accordance with another aspect of the disclosure, a method for operating a combustion system is disclosed. The method may include injecting a fuel jet into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine. The method may further include adjusting a length of an adjustable length duct. The method may further include directing the fuel jet, at least partially, into the adjustable length duct to provide a substantially uniform mixture of fuel and air within the fuel jet.

In accordance with yet another aspect of the disclosure, an internal combustion engine is disclosed. The internal combustion engine may include an engine block having at least one cylinder bore. The internal combustion engine may further include a cylinder head having a flame deck surface disposed at one end of the cylinder bore. The internal combustion engine may further include a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface. The internal combustion engine may further include a fuel injector in fluid connection with the combustion chamber and including one or more orifices opening from an injector tip of the fuel injector, the one or more orifices injecting fuel into the combustion chamber as one or more fuel jets. The internal combustion chamber may further include one or more adjustable length ducts disposed within the combustion chamber between the flame deck surface and the piston top surface, the one or more ducts being disposed such that each of the one or more fuel jets at least partially enters one of the one or more ducts upon being injected into the combustion chamber.

Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
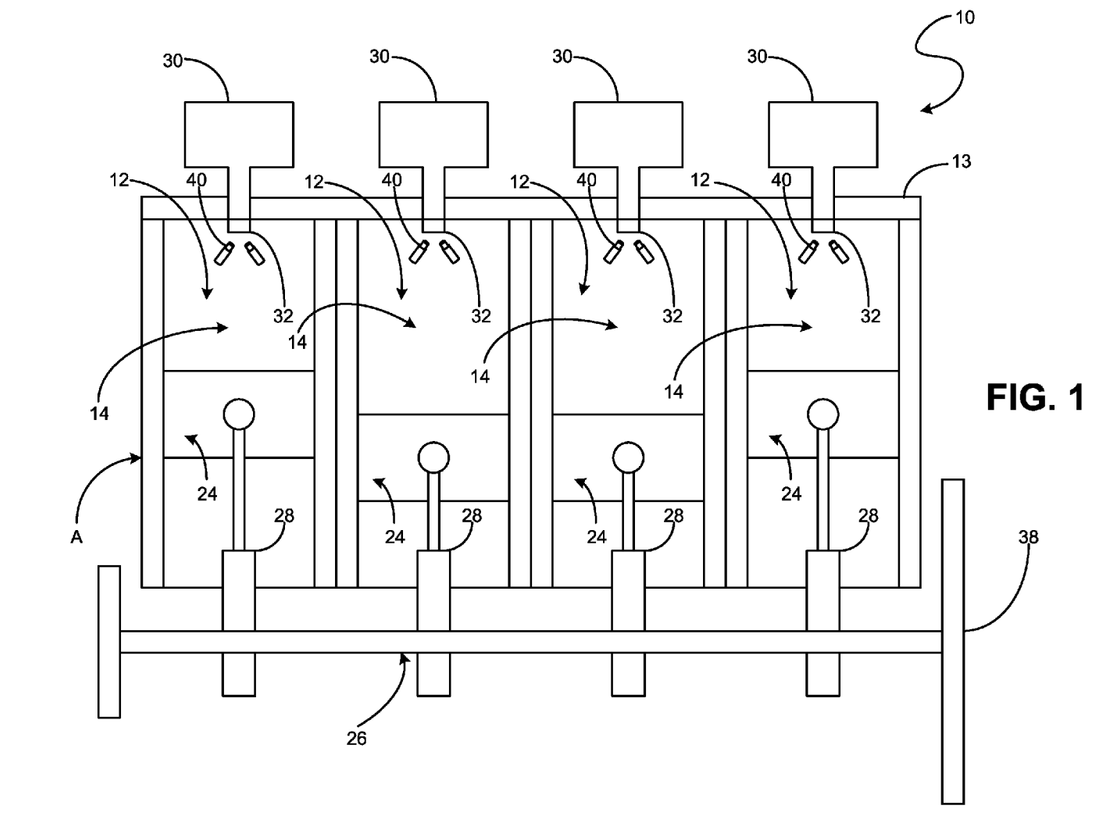
FIG. 1 is a side cross-sectional view of an internal combustion engine, in accordance with an embodiment of the present disclosure.

Turning now to the drawings and with specific reference to FIG. 1, a combustion engine 10 is shown. The engine 10 may be an internal combustion engine having a plurality of cylinders 12. For example, the cylinders 12 may be defined as cylinder bores within an engine block 13 of the engine 10. Each of the plurality of cylinders 12 includes a combustion chamber 14. Each combustion chamber 14 may have a generally cylindrical shape, in accordance with the general shape of the cylinder 12.

Figure 2:
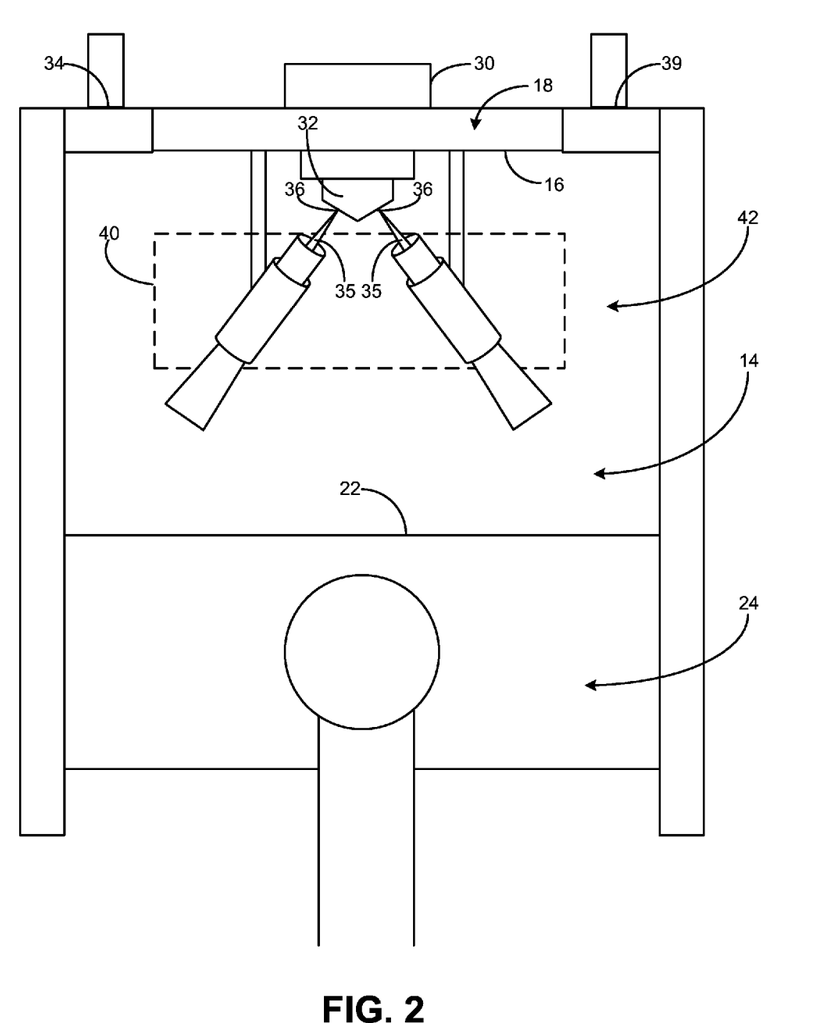
FIG. 2 is a front, cross-sectional view of a cylinder of the internal combustion engine of FIG. 1, as shown taken from the reference notation "A" of FIG. 1, in accordance with the present disclosure.

The combustion chamber 14 is shown in greater detail in the front, cross-sectional view of FIG. 2. As shown in FIG. 2, and with continued reference to FIG. 1, the combustion chamber 14 may be bound at one end by a flame deck surface 16 of a cylinder head 18 of each cylinder 12. The combustion chamber 14 may be further bound at a second end by a piston top surface 22 of a piston 24. The piston 24 is reciprocally disposed within the bore and, as shown in FIG. 1, is connected to a crankshaft 26 via a connecting rod 28. A fuel injector 30 is in fluid connection with the combustion chamber 14 and may be mounted in the cylinder head 18. The fuel injector 30 includes a tip 32 that protrudes within the combustion chamber 14 through the flame deck surface 16. Therefore, the fuel injector 30, via the tip 32, can directly inject fuel into the combustion chamber 14 as, for example, one or more fuel jets.

During operation of the engine 10, air enters the combustion chamber 14 via one or more air intake valves 34 (shown in FIG. 2). Air is able to enter the combustion chamber 14 when the air intake valves 34 are open during an intake stroke and/or at the end of an exhaust stroke and/or at the beginning of a compression stroke. When air is present in the combustion chamber 14, the fuel injector 30, via the tip 32, will inject high pressure fuel through orifices 36 of the tip 32 as fuel jets 35. The fuel jets 35 may generally disperse within the combustion chamber 14 to create a fuel/air mixture within the combustion chamber 14. Ignition produces combustion, which, in turn, provides work on the piston 24 to produce motion upon the crankshaft 26 to drive an output 38. Following combustion, exhaust gas may be expelled from the combustion chamber 14 via one or more exhaust valves 39, when said exhaust valves 39 are open during an exhaust stroke and/or at the end of a power stroke and/or at the beginning of an intake stroke of the engine 10.

Within the combustion chamber 14, uniformity of fuel/air mixture may be relevant to the combustion efficiency and may be relevant to the amount and type of combustion byproducts that are formed. For example, if the fuel/air mixture is too rich in fuel due to insufficient mixing within the combustion chamber 14, then higher soot emissions may occur within the combustion chamber 14 and/or combustion efficiency may be affected. However, using one or more adjustable length ducts 40 disposed within the combustion chamber 14 may provide for more uniform fuel/air mixing within the cylinder 12. Using such adjustable length ducts 40, a lift-off length of a flame associated with a fuel jet 35 may be altered (extended or reduced) to achieve an optimized lift-off length. The adjustable length ducts 40 may alter lift-off length due to energy exchange between the adjustable length ducts 40 and the fuel/air mixture of the fuel jet 35, due to altering fluid dynamics of the fuel/air mixture of the fuel jet 35, and/or due to prevention of lift-off length recession by acting as a flame arrester.

The one or more adjustable length ducts 40 may be disposed within a flame region 42 of the combustion chamber 14. The flame region 42 may be defined as a region of the combustion chamber 14 extending from the flame deck surface 16 to the piston top surface 22, when the piston 24 is at or close to a maximum compression distance or top dead center (TDC) position.

Figure 3:
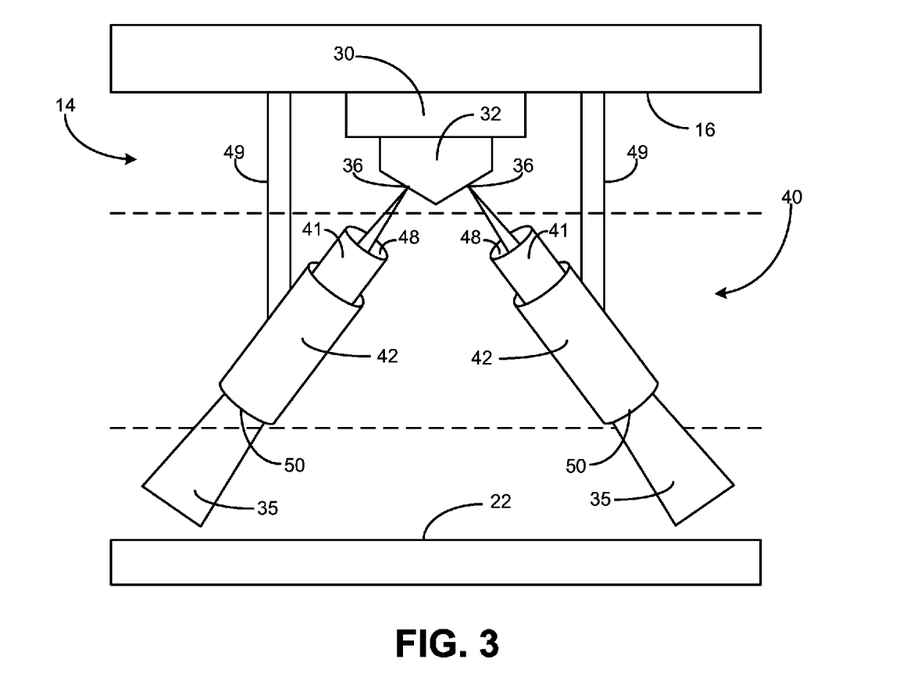
FIG. 3 is a side view of adjustable length ducts for use within the cylinder(s) of FIGS. 1 and 2, in accordance with an embodiment of the disclosure.
Figure 4:
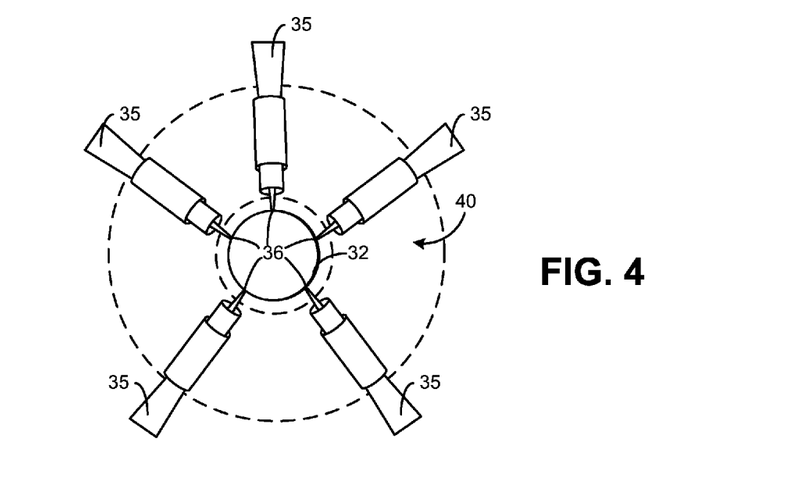
FIG. 4 is a top view of the adjustable length ducts of the embodiment of FIG. 3, shown from above the ducts and an associated fuel injector, in accordance with the embodiment of FIG. 3 and the present disclosure.

To further illustrate the one or more adjustable length ducts 40 and their interaction with one or more fuel jets 35 injected from the one or more orifices 36 of the tip 32 of the fuel injector 30, the adjustable length ducts 40, within the combustion chamber 14, are shown in greater detail in FIGS. 3 and 4. Adjustable length ducts 40 have the ability to vary in length while present in the combustion chamber 14. The variation of duct length may be controlled passively or actively, as will be described in more detail below. Varying the duct length during combustion may lead to optimized equivalence ratios at lift-off lengths of flames associated with the fuel jets 35, which may, in turn, lead to lower soot production within the combustion chamber 14.

Figure 5:
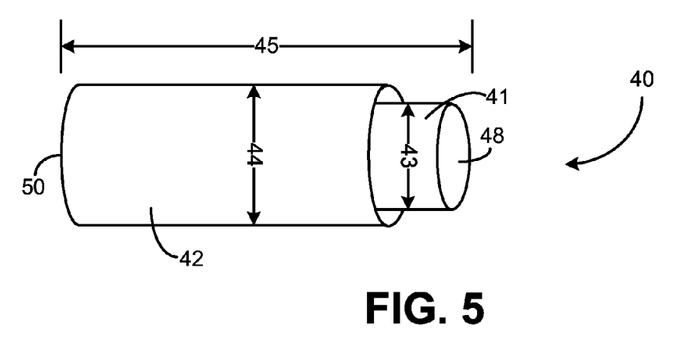
FIG. 5 is a side view of an adjustable length duct which may be used in conjunction with the embodiment of FIGS. 3-4, wherein the adjustable length duct has a first length, in accordance with an embodiment of the disclosure.
Figure 6:
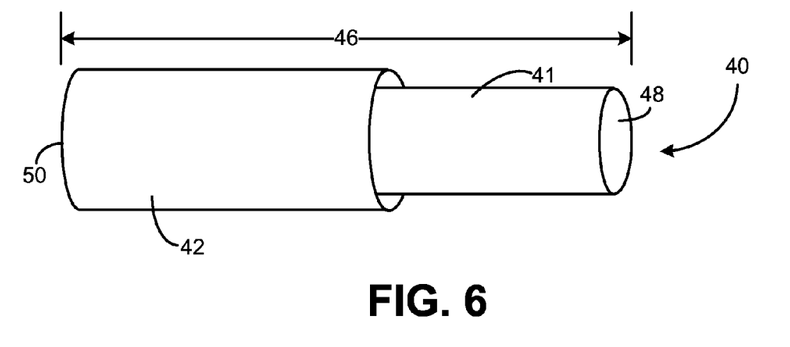
FIG. 6 is a side view of the adjustable length duct of FIG. 5, wherein the adjustable length duct has a second length, the second length greater than the first length of FIG. 5, in accordance with an embodiment of the disclosure.

The adjustable length ducts may include a first member 41 and a second member 42. Length of the adjustable length ducts 40 may be altered by moving the second member 42 (e.g., by sliding and/or rotating the second member 42) relative to the first member 41. The second member 42 may be able to move relative to the first member 41 if the first and second members 41, 42 are arranged concentrically. To enable such a concentric arrangement, the first and second members 41, 42 may be generally tubular shaped structures, as shown. As shown in the exemplary adjustable length duct 40 of FIG. 5, the first member 41 may have a first radius 43 and the second member may have a second radius 44, wherein the second radius 44 is greater than the first radius 43. Because the second radius 44 is greater than the first radius 43 and the first and second members 41, 42 are arranged concentrically, the first and second members 41, 42 may move relative to each other, allowing a first length 45 to expand to a second length 46, which is shown in FIG. 6. Conversely, the adjustable length duct 40 may contract the length 46 to the length 45, or any other length for that matter, during length adjustments. The lengths 45, 46 shown in FIGS. 5 and 6 are merely exemplary and, by using the spring system 64, length of the adjustable length ducts 60 may be increased or decreased by any suitable amount.

Upon being injected out of the one or more orifices 36, the fuel jets 35 may, at least partially, enter the adjustable length ducts 40 at first member openings 48 and may flow through the ducts 40 to second member outlets 50. In some examples, the adjustable length ducts 40 may be positioned and/or supported within the combustion chamber 14 by a support structure 49. The support structure 49 may be any mounting, wiring, or other positioning device suitable for positioning the adjustable length ducts 40 within the combustion chamber 14. In some examples, the adjustable length ducts 40 may be positioned with the first member openings 48 directly affixed to the cylinder head 18 and/or the fuel injector 30, such that the ducts 40 are aligned with and/or directly flush with the orifices 36. In such examples, the support structure 49 may not be necessary.

Use of the adjustable length ducts 40 may provide improved mixing of a fuel/air mixture within the fuel jets 35 prior to combustion. The adjustable length ducts 40 may direct combustion away from the fuel injector 30, such that longer flame lift-off lengths may be achieved. Further, by channeling the fuel jets 35 into the adjustable length ducts 40, entrainment of combustion products from downstream regions of the same or neighboring fuel jets 35 may be inhibited or reduced. By using such adjustable length ducts 40, levels of soot within the combustion chamber 14 may be reduced greatly.

Figure 7:
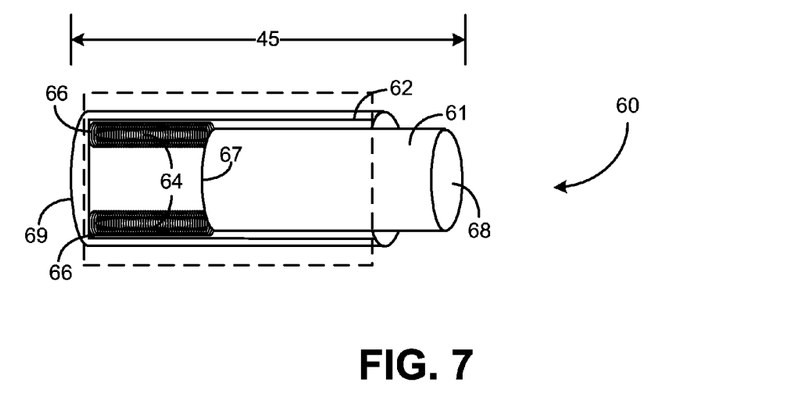
FIG. 7 is a cross-sectional side view of an adjustable length duct which may be used in conjunction with the embodiment of FIGS. 3-4, wherein the adjustable length duct includes a spring system and has a first length, in accordance with an embodiment of the disclosure.
Figure 8:
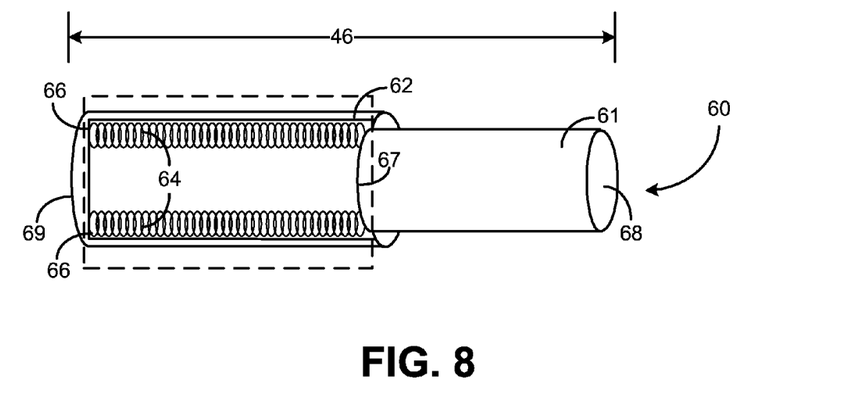
FIG. 8 is another cross-sectional side view of the adjustable length duct of FIG. 7, wherein the adjustable length duct has a second length, the second length greater than the first length of FIG. 7, in accordance with an embodiment of the disclosure.

For controlling the length of adjustable length ducts, a variety of mechanisms associated with said ducts may be employed. For example, FIGS. 7 and 8 illustrate an embodiment of an adjustable length duct 60, in a cross-sectional view, which may be used in conjunction with the embodiments of FIGS. 1-6. The adjustable length duct 60 includes a first member 61 and a second member 62, similar to the adjustable length ducts 40 of FIGS. 1-6. However, adjustment of the length of the adjustable length duct 60 may be controlled passively by using a resistive element, such as a spring system 64.

The spring system 64, as shown, may have a first end 65 attached to the first member 61 at a location proximate to an outlet 67 of the first member 61. Additionally, the spring system may have a second end 66 attached to the second member 62 at a location proximate to the outlet 69 of the second member 62. Resistance of the spring system 64 may be configured based on environmental factors within the combustion chamber 14, such as, but not limited to, a velocity of the fuel jets 35 upon exiting the fuel injector 31.

Based on pressure and forces associated with the one or more fuel jets 35, the spring system 64 may expand or contract, thereby altering the length of the adjustable length duct 60. For example, the first and second members 61, 62 may move relative to each other upon expansion of the spring system 64, allowing the first length 45 (FIG. 7) to expand to the second length 46 (FIG. 8). Conversely, the adjustable length duct 60 may contract the length 46 to the length 45, or any other length for that matter, when the spring system 64 is compressed. The lengths 45, 46 shown in FIGS. 7 and 8 are merely exemplary and, by using the spring system 64, length of the adjustable length ducts 60 may be increased or decreased by any suitable amount.

Figure 9:
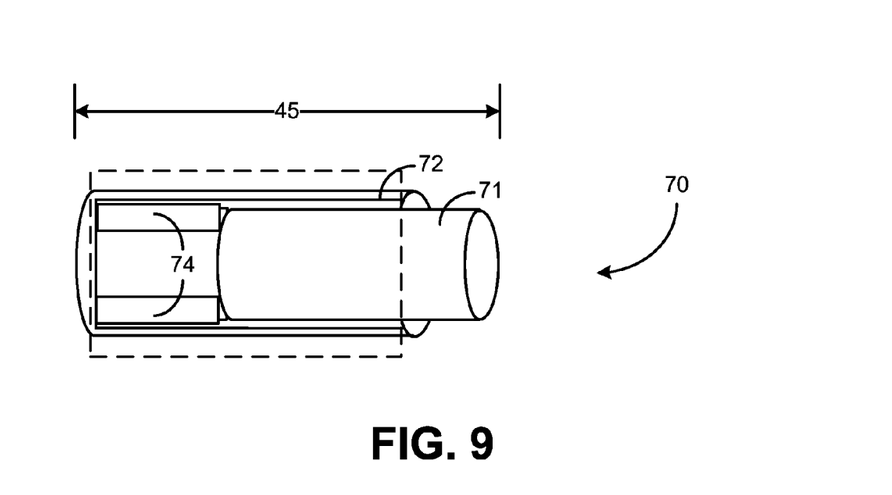
FIG. 9 is a cross-sectional side view of an adjustable length duct which may be used in conjunction with the embodiment of FIGS. 3-4, wherein the adjustable length duct includes an actuator and has a first length, in accordance with an embodiment of the disclosure.
Figure 10:
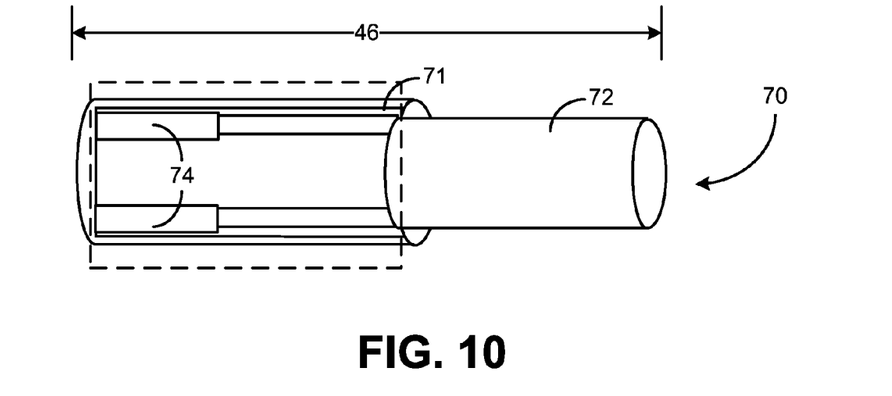
FIG. 10 is another cross-sectional side view of the adjustable length duct of FIG. 9, wherein the adjustable length duct has a second length, the second length greater than the first length of FIG. 9, in accordance with an embodiment of the disclosure.

Turning now to FIGS. 9 and 10, an embodiment of an example adjustable length duct 70 is shown in a cross-sectional view. The adjustable length duct 70 may be used in conjunction with the embodiments of FIGS. 1-6. For controlling the length of the adjustable length duct 70, actuators 74 are used to actively control the length of the adjustable length duct 70 by, for example, moving the first and second members 71, 72 relative to each other. For example, the first and second members 71, 72 may move relative to each other upon actuation of the actuators 74, allowing the first length 45 (FIG. 9) to expand to the second length 46 (FIG. 10). Conversely, the adjustable length duct 70 may contract the length 46 to the length 45, or any other length for that matter, when the actuator 74 is actuated. The lengths 45, 46 shown in FIGS. 9 and 10 are merely exemplary and, by using the actuators 74, length of the adjustable length ducts 70 may be increased or decreased by any suitable amount.

Figure 11:
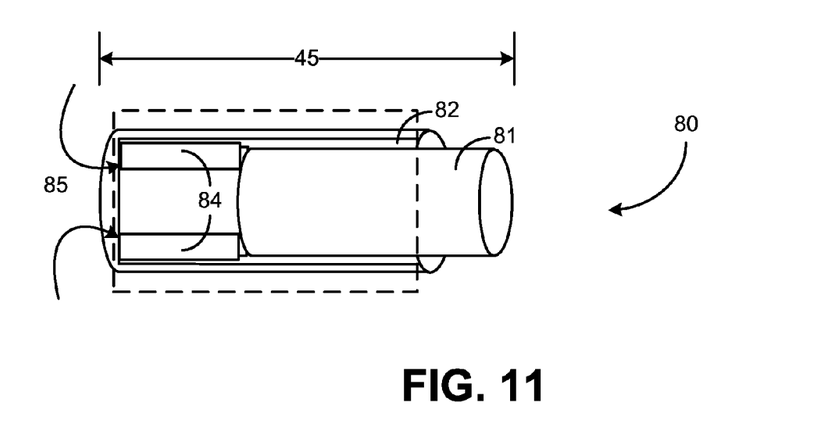
FIG. 11 is a cross-sectional side view of an adjustable length duct which may be used in conjunction with the embodiment of FIGS. 3-4, wherein the adjustable length duct includes a hydraulic actuator and has a first length, in accordance with an embodiment of the disclosure.
Figure 12:
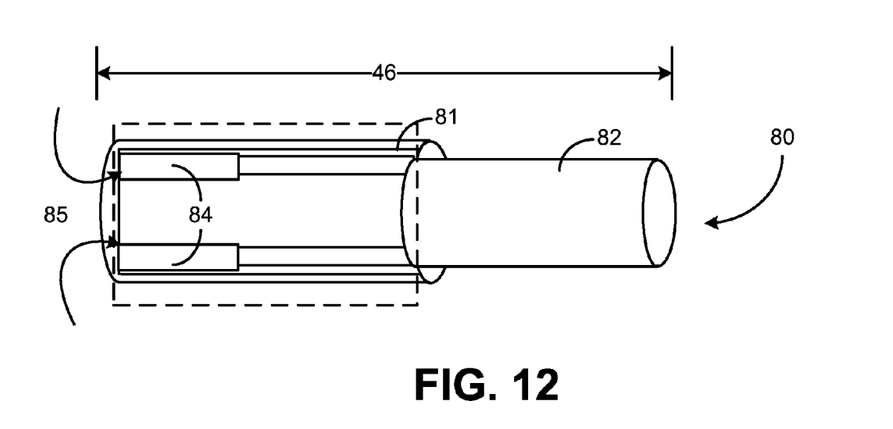
FIG. 12 is another cross-sectional side view of the adjustable length duct of FIG. 11, wherein the adjustable length duct has a second length, the second length greater than the first length of FIG. 11, in accordance with an embodiment of the disclosure.

FIGS. 11 and 12 illustrate an embodiment of an adjustable length duct 80, as shown in a cross-sectional view. The adjustable length duct 80 may be used in conjunction with the embodiments of FIGS. 1-6. For controlling the length of the adjustable length duct 80, hydraulic actuators 84 are used to actively control the length of the adjustable length duct 80 by, for example, moving the first and second members 81, 82 relative to each other. For example, the first and second members 81, 82 may move relative to each other upon actuation of the hydraulic actuators 84, allowing the first length 45 (FIG. 11) to expand to the second length 46 (FIG. 12). Conversely, the adjustable length duct 80 may contract the length 46 to the length 45, or any other length for that matter, when the hydraulic actuators 84 are actuated. The lengths 45, 46 shown in FIGS. 11 and 12 are merely exemplary and, by using the hydraulic actuators 84, length of the adjustable length ducts 60 may be increased or decreased by any suitable amount.

The hydraulic actuators 84 may utilize pressurized fuel for actuation. Other pressurized fluids could also be used. For example, forces 85 imposed on the hydraulic actuators 84 are shown in FIGS. 11 and 12; the resultant effect of the forces 85 may cause actuation of the hydraulic actuators 84 and, in turn, cause adjustment of the length of the adjustable length duct 80.

Figure 13:
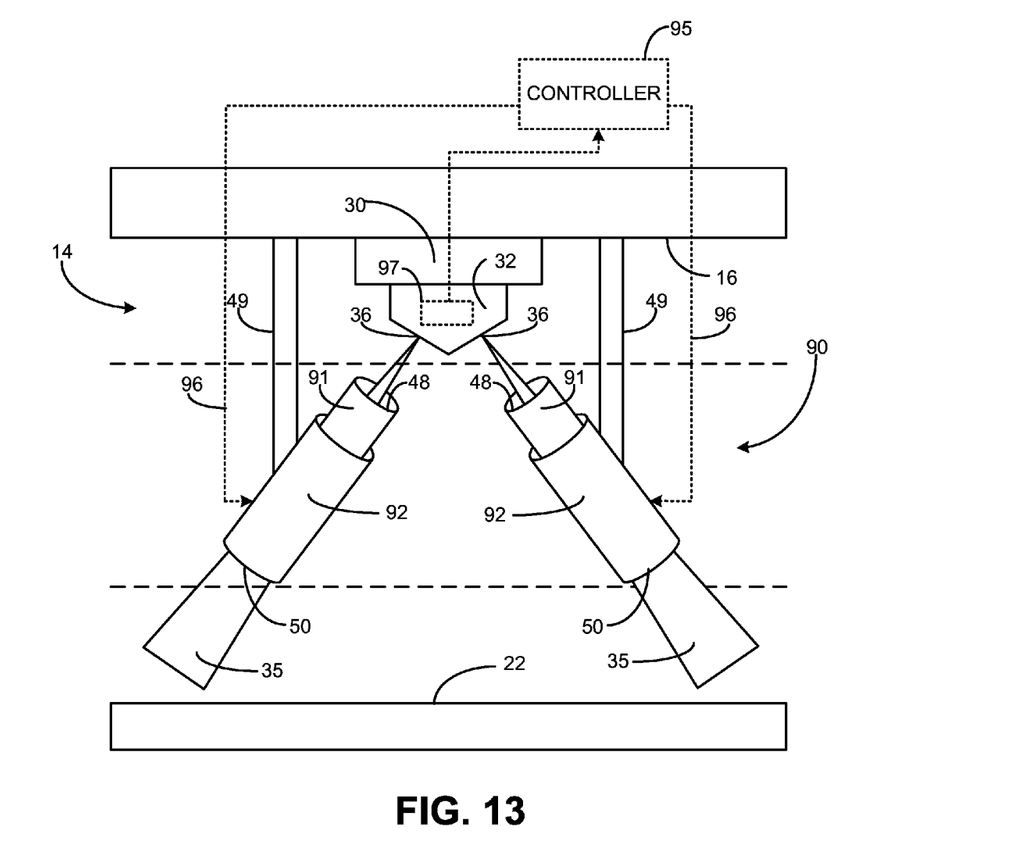
FIG. 13 is a side view of adjustable length ducts for use within the cylinder(s) of FIGS. 1 and 2, wherein the length of the ducts may be influenced by a controller, in accordance with an embodiment of the disclosure.

Another form of actuator which may be used to control the length of a duct within a combustion chamber is an electric actuator, which may be controlled by a controller. FIG. 13 illustrates example adjustable length ducts 90 within the combustion chamber 14, wherein length of the ducts 90 may be controlled via electric actuators 94, which are shown in the cross-sectional views of one of the adjustable length ducts 90 in FIGS. 14 and 15. The electric actuators 94 may receive electronic signals from a controller 95, the electronic signals instructing the electric actuators 94 to lengthen or shorten the length of the adjustable length ducts 90. The controller 95 may be any electronic controller or computing system including a processor which operates to perform operations, execute control algorithms, store data, retrieve data, gather data, and/or any other computing or controlling task desired.

The level of adjustment prescribed in the electronic signals 96 may be determined using information provided to the controller 95 by a flow sensor 97. The information provided by the flow sensor 97 may include, but is not limited to including, flow rate of the fuel jets 35, fuel pressure output from the fuel injector 31, fuel velocity of the fuel jets 35, injection timing of one or more of the fuel jets 35, and any other information associated with flow of fuel from the fuel injector 31.

Figure 14:
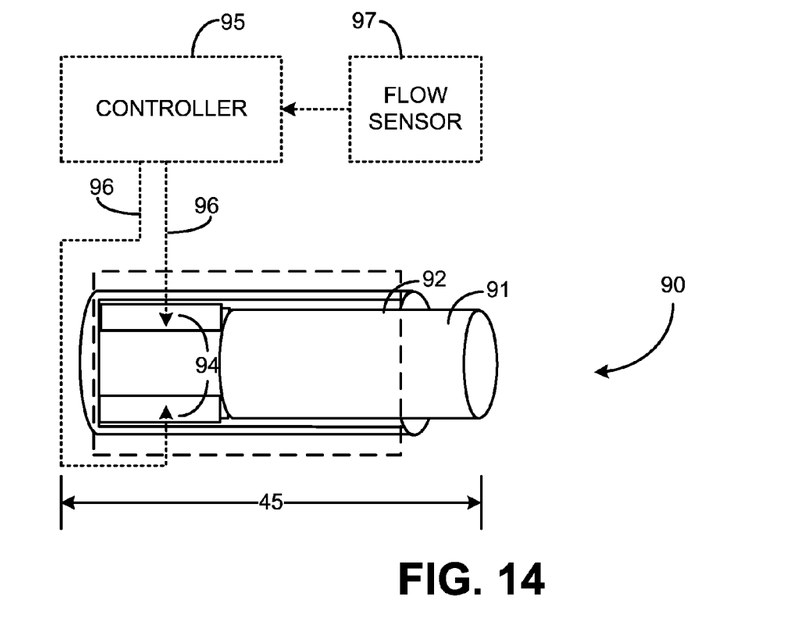
FIG. 14 is a cross-sectional side view of an adjustable length duct which may be used in conjunction with the embodiment of FIG. 13, wherein the adjustable length duct includes an electronic actuator associated with the controller and has a first length, in accordance with an embodiment of the disclosure.
Figure 15:
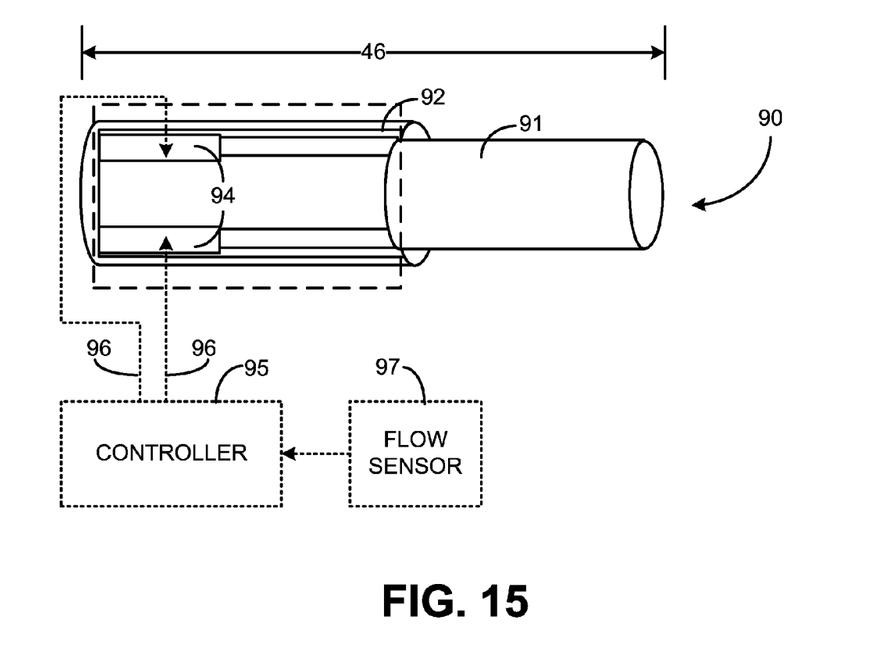
FIG. 15 is another cross-sectional side view of the adjustable length duct of FIG. 14, wherein the adjustable length duct has a second length, the second length greater than the first length of FIG. 14, in accordance with an embodiment of the disclosure.

For controlling the length of the adjustable length duct 90, electric actuators 94 are used to actively control the length of the adjustable length duct 90 by following instructions from the controller 95 to, for example, move the first and second members 91, 92 relative to each other. For example, the first and second members 91, 92 may move relative to each other upon actuation of the actuators 94, allowing the first length 45 (FIG. 14) to expand to the second length 46 (FIG. 15). Conversely, the adjustable length duct 90 may contract the length 46 to the length 45, or any other length for that matter, when the electric actuator 94 is actuated. The lengths 45, 46 shown in FIGS. 14 and 15 are merely exemplary and, by using the electric actuators 94, length of the adjustable length ducts 90 may be increased or decreased by any suitable amount.

INDUSTRIAL APPLICABILITY

The present disclosure relates generally to internal combustion engines and, more specifically, to ducted combustion systems. While the present disclosure shows the embodiments as related to internal combustion engines having reciprocating pistons, the teachings of the disclosure are certainly applicable to other combustion systems, which utilize diffusion or non-premixed flames, such as gas turbines, industrial burners, and the like. As discussed above, the various arrangements of ducts and their related elements are useful in promoting a substantially uniform fuel/air mixture within combustion chambers and may inhibit or reduce entrainment of recirculated combustion products from downstream regions into upstream regions of fuel jets injected into combustion chambers. However, using such systems and methods for ducted combustion may also decrease fuel/air mixing, while reducing equivalence ratio at the lift-off length.

An example method utilizing the ducted combustion systems and associated elements shown in FIGS. 1-15 and described above is exemplified in the flowchart of FIG. 16, which represents a method 200 for operating a combustion system. The method 200 begins at block 210, by injecting a fuel jet 35 into the combustion chamber 14 of the internal combustion engine 10.

As described above, adjustable length ducts are useful during operation of combustion systems. Therefore, the method 200 may include adjusting a length of an adjustable length duct 40, as shown in block 220. In some examples, adjustment of the length of the duct 40 may include moving the second member 42 relative to the first member 41, when the first and second members 41, 42 are arranged concentrically. Adjustment of the length of the duct 40 may be accomplished passively (e.g., the spring system 64 of FIGS. 7 and 8) or actively (e.g., the actuators 74, 84, 94 of FIGS. 9-15).

Figure 16:
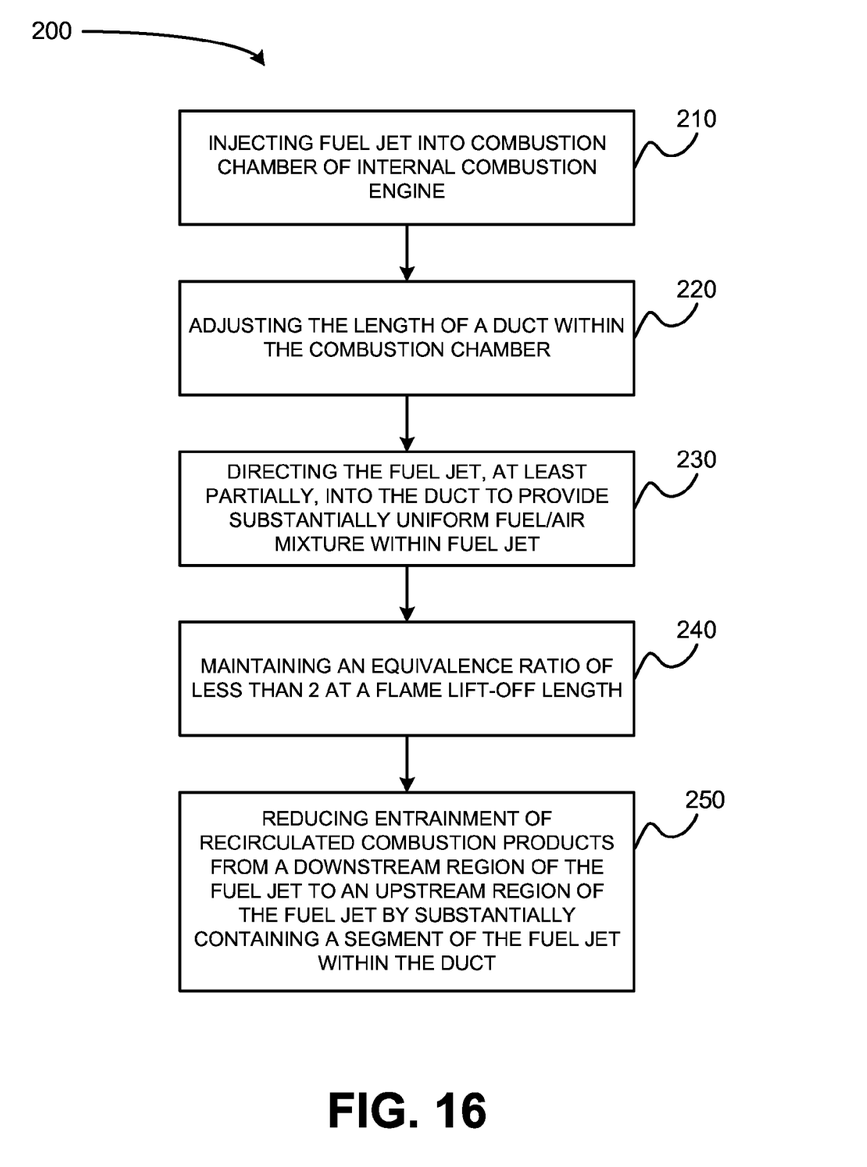
FIG. 16 is a block diagram of a flowchart representative of a method for operating a combustion system, in accordance with an embodiment of the disclosure.

The fuel jet 35 may be directed, at least partially, into the adjustable length duct 40, to provide a substantially uniform fuel/air mixture within the fuel jets 35, as shown in block 230. While the present description of block 230 refers to the one or more ducts 40 of FIGS. 3 and 4, the block 220, the block 230 and/or the method 200, generally, may employ any of the ducts shown above in FIGS. 3-15.

The disclosed ducted combustion systems may be configured to use the one or more ducts 40 to direct combustion away from the fuel injector tip 32, so that the equivalence ratio at a flame lift-off length produced during combustion is lower. Using the one or more adjustable length ducts 40, greater uniformity of equivalence ratio within the fuel jets 35 may be achieved. Maintaining a reduced equivalence ratio at the lift-of length may reduce soot formation. Achieving a reduced equivalence ratio at the lift-off length may be accomplished by altering the lift-off length, when employing any of the aspects of the present application. Alterations to the lift-off length may occur if heat is transferred from the fuel/air mixture of the fuel jets 35 to the duct structure 40. Additionally or alternatively, alterations to the lift-off length may be achieved by alteration of fuel jet fluid dynamics, which are resultant of characteristics of the ducts 45. Further, use of ducts 45 may prevent lift-off length recession by acting as a flame arrester.

Substantially soot-free combustion may be achieved if the equivalence ratio at the flame lift-off length is less than two. Therefore, at block 240, the method 200 may include maintaining an equivalence ratio of less than two at the flame lift-off length. Adjustment of the length of ducts 40 may allow for a lift-off length which allows the equivalence ratio to be less than 2.

At block 250, the method 200 may reduce entrainment of recirculated combustion products from a downstream region of the fuel jet 35 to an upstream region of the fuel jet 35 by substantially containing a segment of the fuel jet 35 within a duct 40. Reducing such entrainment may lead to an overall reduction in soot production within the combustion chamber 14 and may lead to greater overall efficiency of the internal combustion engine 10. Presence of the adjustable length ducts 40 may alter amount and position of entrainment of recirculated combustion products, within the fuel jets 35.

It will be appreciated that the present disclosure provides ducted combustion systems, internal combustion engines utilizing ducted combustion, and methods for operating combustion systems utilizing ducted combustion. While only certain embodiments have been set forth, alternatives and modifications will be apparent from the above description to those skilled in the art. These and other alternatives are considered equivalents and within the spirit and scope of this disclosure and the appended claims.

What is claimed is:

1. A ducted combustion system, comprising:
a combustion chamber defined as an enclosure bound at a first end by a flame deck surface of a cylinder head of an internal combustion engine, and bound at a second end by a piston top surface of a piston disposed within the internal combustion engine;
a fuel injector in fluid connection with the combustion chamber and including one or more orifices opening from an injector tip of the fuel injector, the one or more orifices injecting fuel into the combustion chamber as one or more fuel jets; and
one or more adjustable length ducts disposed within the combustion chamber between the flame deck surface and the piston top surface, the one or more adjustable length ducts disposed such that each of the one or more fuel jets at least partially enters one of the one or more adjustable length ducts upon being injected into the combustion chamber.

2. The ducted combustion system of claim 1, wherein at least one of the one or more adjustable length ducts includes a first member and a second member, the first member and the second member being arranged concentrically.

3. The ducted combustion system of claim 2, wherein the first member and the second member are generally tubular shaped members.

4. The ducted combustion system of claim 3, wherein a radius of the second member is greater than a radius of the first member.

5. The ducted combustion system of claim 1, wherein a length of the adjustable length duct is adjusted passively using a resistive element associated with the adjustable length duct.

6. The ducted combustion system of claim 2, wherein a length of the adjustable length duct is adjusted passively using a spring system within the adjustable length duct, the spring system disposed between an outlet of the second member and an outlet of the first member.

7. The ducted combustion system of claim 2, wherein a length of the adjustable length duct is adjusted actively using an actuator within the adjustable length duct, the actuator disposed between an outlet of the second member and an outlet of the first member.

8. The ducted combustion system of claim 1, wherein a length of the adjustable length duct is adjusted actively using an actuator associated with the adjustable length duct.

9. The ducted combustion system of claim 8, wherein the actuator is a hydraulic actuator configured to adjust the length of the adjustable length duct based on a fluid pressure.

10. The ducted combustion system of claim 8, wherein the actuator is an electronic actuator configured to adjust the length of the adjustable length duct based on electronic signals.

11. The ducted combustion system of claim 10, further comprising:
a flow sensor; and
a controller configured to determine the electronic signals, the electronic signals being for adjusting the length of the adjustable length duct and the electronic signals being determined based on signals received from the flow sensor.

12. A method for operating a combustion system, comprising:
injecting a fuel jet into a combustion chamber of an internal combustion engine, the combustion chamber defined as an enclosure bound at a first end by a flame deck of a cylinder of an internal combustion engine, and bound at a second end by a piston top surface of a piston disposed within the internal combustion engine;
adjusting a length of an adjustable length duct; and
directing the fuel jet, at least partially, into the adjustable length duct to provide a substantially uniform mixture of fuel and air within the combustion chamber.

13. The method of claim 12, wherein adjusting the length of the adjustable length duct includes moving a second member of the adjustable length duct relative to a first member of the adjustable length duct, the first and second members of the adjustable length duct being arranged concentrically.

14. The method of claim 12, wherein adjusting the length of the adjustable length duct includes passively adjusting the length using a spring system associated with the adjustable length duct.

15. The method of claim 13, wherein moving the second member of the adjustable length duct relative to the first member of the adjustable length duct further includes passively adjusting the length using a spring system within the adjustable length duct, the spring system disposed between an outlet of the second member and an outlet of the first member.

16. The method of claim 12, wherein adjusting the length of the adjustable length duct includes actively adjusting the length using an actuator associated with the adjustable length duct.

17. The method of claim 16, wherein actively adjusting the length using the actuator includes using a hydraulic actuator configured to adjust the length of the adjustable length duct based on a fluid pressure.

18. The method of claim 16, wherein adjusting the length using the actuator includes using an electronic actuator configured to adjust the length of the adjustable length duct based on electronic signals and the method further includes:
receiving, by a controller, flow signals from a flow sensor;
determining, by the controller, the electronic signals based on the flow signals, the electronic signals being for adjusting the length.

19. An internal combustion engine, comprising:
an engine block having at least one cylinder bore;
a cylinder head having a flame deck surface disposed at one end of the cylinder bore;
a piston connected to a crankshaft and configured to reciprocate within the cylinder bore, the piston having a piston top surface facing the flame deck surface such that a combustion chamber is defined within the cylinder bore bound at a first end by the flame deck surface and at a second end by the piston top surface;
a fuel injector in fluid connection with the combustion chamber and including one or more orifices opening from an injector tip of the fuel injector, the one or more orifices injecting fuel into the combustion chamber as one or more fuel jets; and
one or more adjustable length ducts disposed within the combustion chamber between the flame deck surface and the piston top surface, the one or more adjustable length ducts disposed such that each of the one or more fuel jets, at least partially, enters one of the one or more adjustable length ducts upon being injected into the combustion chamber.

20. The internal combustion engine of claim 19, wherein at least one of the one or more adjustable length ducts includes a first member and a second member, the first member and the second member being arranged concentrically.

* * * * *